(12) United States Patent
Tateishi et al.

(10) Patent No.: US 6,603,716 B1
(45) Date of Patent: Aug. 5, 2003

(54) OPTICAL PICKUP DIRECTION DETECTION UNIT AND OPTICAL PICKUP DIRECTION DETECTION METHOD

(75) Inventors: Kiyoshi Tateishi, Saitama (JP); Mitsuru Sato, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/534,132

(22) Filed: Mar. 23, 2000

(30) Foreign Application Priority Data

Mar. 24, 1999 (JP) .......................................... P11-078809

(51) Int. Cl.$^7$ ................................................. G11B 7/00
(52) U.S. Cl. ................................ 369/44.26; 369/44.28; 369/44.32
(58) Field of Search .......................... 369/44.26, 44.32, 369/44.28, 44.13, 275.3, 275.4

(56) References Cited

U.S. PATENT DOCUMENTS

| 5,193,081 | A | * | 3/1993 | Osawa et al. | ............ | 369/44.25 |
| 5,408,452 | A | | 4/1995 | Sakemoto et al. | ........ | 369/44.26 |
| 5,483,512 | A | * | 1/1996 | Yanagawa | .................... | 369/116 |
| 5,774,437 | A | * | 6/1998 | Yoshida | .................... | 369/47.45 |
| 5,875,163 | A | * | 2/1999 | Kuroda et al. | ........... | 369/47.48 |
| 5,920,530 | A | * | 7/1999 | Kuroda et al. | ........... | 369/47.32 |
| 6,169,715 | B1 | * | 1/2001 | Nakamura et al. | ........ | 369/44.26 |
| 6,181,657 | B1 | * | 1/2001 | Kuroda et al. | ........... | 369/275.3 |
| 6,192,009 | B1 | * | 2/2001 | Kim | ........................ | 369/44.25 |
| 6,324,136 | B1 | * | 11/2001 | Yoshida et al. | .......... | 369/47.22 |

FOREIGN PATENT DOCUMENTS

| EP | 0 751 506 A2 | 1/1997 | ............ G11B/7/007 |
| EP | 0 752 701 A2 | 1/1997 | ............ G11B/7/00 |

* cited by examiner

Primary Examiner—Thang V. Tran
Assistant Examiner—Bach Vuong
(74) Attorney, Agent, or Firm—Sughrue Mion, PLLC (57) ABSTRACT

In an optical pickup direction detection unit, a detector group receives return light from an optical disc and outputs a light detection electric signal, a push-pull signal generator generates a push-pull signal, and a land prepit signal generator generates a land prepit signal. Further, a direction determiner detects a direction detection signal based on a tracking error signal and the land prepit signal.

13 Claims, 11 Drawing Sheets

PRIOR ART

OPTICAL PICKUP DIRECTION DETECTION UNIT AND OPTICAL PICKUP DIRECTION DETECTION METHOD

BACKGROUND OF THE INVENTION

1. Field of the Invention

This invention relates to an optical pickup direction detection unit and an optical pickup direction detection method and more particularly to, in an optical pickup for wiring information onto an optical disc based on emission light from a light source or reading information from an optical disc based on return light from the optical disc, an optical pickup direction detection unit and an optical pickup direction detection method for determining the direction to move the optical pickup in order to position emission light on an information record track of the optical disc.

2. Description of the Related Art

An optical pickup comprising a light source, an optical system, and a light detection system is used to apply emission light from the light source to the information record side of the surface of an optical disc such as a CD (compact disc) or a CD-ROM (compact disc-read-only memory) for writing optical disc record information of music, data, etc., or read optical disc record information from light reflected on and returned from the information record side of an optical disc.

To reliably write the information onto the optical disc or reliably read the information from the optical disc in the optical pickup, it is necessary to control so as to always apply emission light onto a record location on the information record side of the optical disc, such as an information record track, namely, it is necessary to perform tracking servo control, and it is necessary to control so as to converge emission line on a record location as a spot-like point, namely, it is necessary to perform focusing servo control.

A tracking servo control technique, for example, as shown in FIGS. 11(A) to 11(D) is known.

Figure 11:
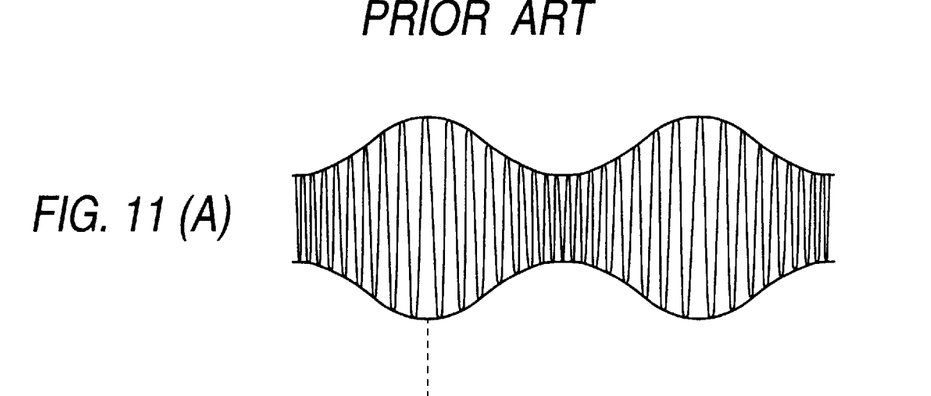
FIGS. 11(A) to 11(D) are drawings to describe problems in a conventional optical pickup.

FIG. 11(D) is a sectional view of an optical disc wherein the surface of the optical disc is cut in the radial direction of the disc. A projection portion L is called a land and a recess portion G is called a groove. Information is written into and read from the grove. If the optical pickup is moved in the radial direction of the disc (right and left in FIG. 11), emission light from the optical pickup moves so as to cross the land L and the groove G.

At this time, a reproduction (playback) RF signal from a photodetector receiving return light becomes as shown in FIG. 11(A). If the reproduction (playback) RF signal is made to pass through a low-pass filter (LPF) or the envelope of the signal is taken, a radial contrast signal RC as shown in FIG. 11(B) is provided. As shown here, the radial contrast signal RC has the center of the crest of the waveform matching the center position of the land L and the center of the trough of the waveform matching the center position of the groove G.

Light from the photodetector receiving return light is converted into an electric signal, whereby a tracking error signal TE as shown in FIG. 11(C) can be provided. The tracking error signal TE has a waveform passing through a zero level B (crossing zero) at the point corresponding to the center position of the groove G as shown in the part of A.

Therefore, to perform tracking servo control, first the optical pickup is moved in any direction, position in the radial direction based on the slope of the tracking error signal TE (differential coefficient) so as to become the center of a predetermined trough of the radial contrast signal RC. This operation is called "bringing into tracking servo control". Then, position control is performed so that the tracking error signal TE crosses zero, whereby tracking servo control is performed.

However, as optical discs with information recorded at a high density, such as a DVD (digital versatile disc), have been used in recent years, the following problem arises in the tracking servo control of the optical pickup in the related art described above:

As information is recorded on a disc at a higher density, the track pitch of land L and groove G (the distance between the center positions in FIG. 11(D)) becomes narrower and a limitation is imposed on the groove depth, etc. Thus, the asperities of the waveform of the radial contrast signal RC become very small, the S/N ratio of the signal lowers, and the position of each trough of the radial contrast signal RC may be detected erroneously. If the position of the trough of the radial contrast signal RC is detected erroneously, the direction to move the optical pickup is determined erroneously and it becomes hard to bring into tracking servo control at a predetermined position; tracking control becomes unstable.

SUMMARY OF THE INVENTION

It is therefore an object of the invention to provide an optical pickup direction detection unit and an optical pickup direction detection method for making it possible to bring into tracking servo control stably if the track pitch of an optical disc is narrow.

In order to achieve the above object, according to the invention, there is provided, in an optical pickup for writing optical disc record information onto an information record track of an optical disc having prepits based on emission light from a light source or reading the optical disc record information from return light provided by reflecting emission light from the light source on the information record track, an optical pickup direction detection unit for detecting a direction to move the optical pickup in order to position the emission light on the information record track, the optical pickup direction detection unit comprising: a photodetector for receiving the return light and outputting a light detection electric signal; push-pull signal generation means for generating a push-pull signal from the light detection electric signal from the photodetector; prepit signal generation means for extracting a prepit component from the push-pull signal and generating a prepit signal; tracking error signal generation means for generating a tracking error signal from the light detection electric signal from the photodetector; and optical pickup move direction detection means for detecting the move direction of the optical pickup based on the tracking error signal and the prepit signal.

Further, according to the invention, there is provided, in an optical pickup for writing optical disc record information onto an information record track of an optical disc having prepits based on emission light from a light source or reading the optical disc record information from return light provided by reflecting emission light from the light source on the information record track, an optical pickup direction detection method for determining a direction to move the optical pickup in order to position the emission light on the information record track, the optical pickup direction detection method comprising the steps of: receiving the return light and outputting a light detection electric signal; generating a push-pull signal from the light detection electric signal; extracting a prepit component from the push-pull signal and generating a prepit signal; generating a tracking error signal from the light detection electric signal; and detecting the move direction of the optical pickup based on the tracking error signal and the prepit signal.

DETAILED DESCRIPTION OF THE PREFERRED EMBODIMENTS

Referring now to the accompanying drawings, there are shown preferred embodiments of the optical pickup direction detection unit according to the invention.

In the embodiments described below, the direction of an optical pickup is detected using an embossment-like recess (prepit) called "land prepit" provided in a land portion of an optical disc. The prepit maybe provided in a groove portion of an optical disc; in the embodiments described below, an optical disc formed with land prepits is taken as an example and a method of using the land prepits will be discussed.

(1) First Embodiment

Figure 1:
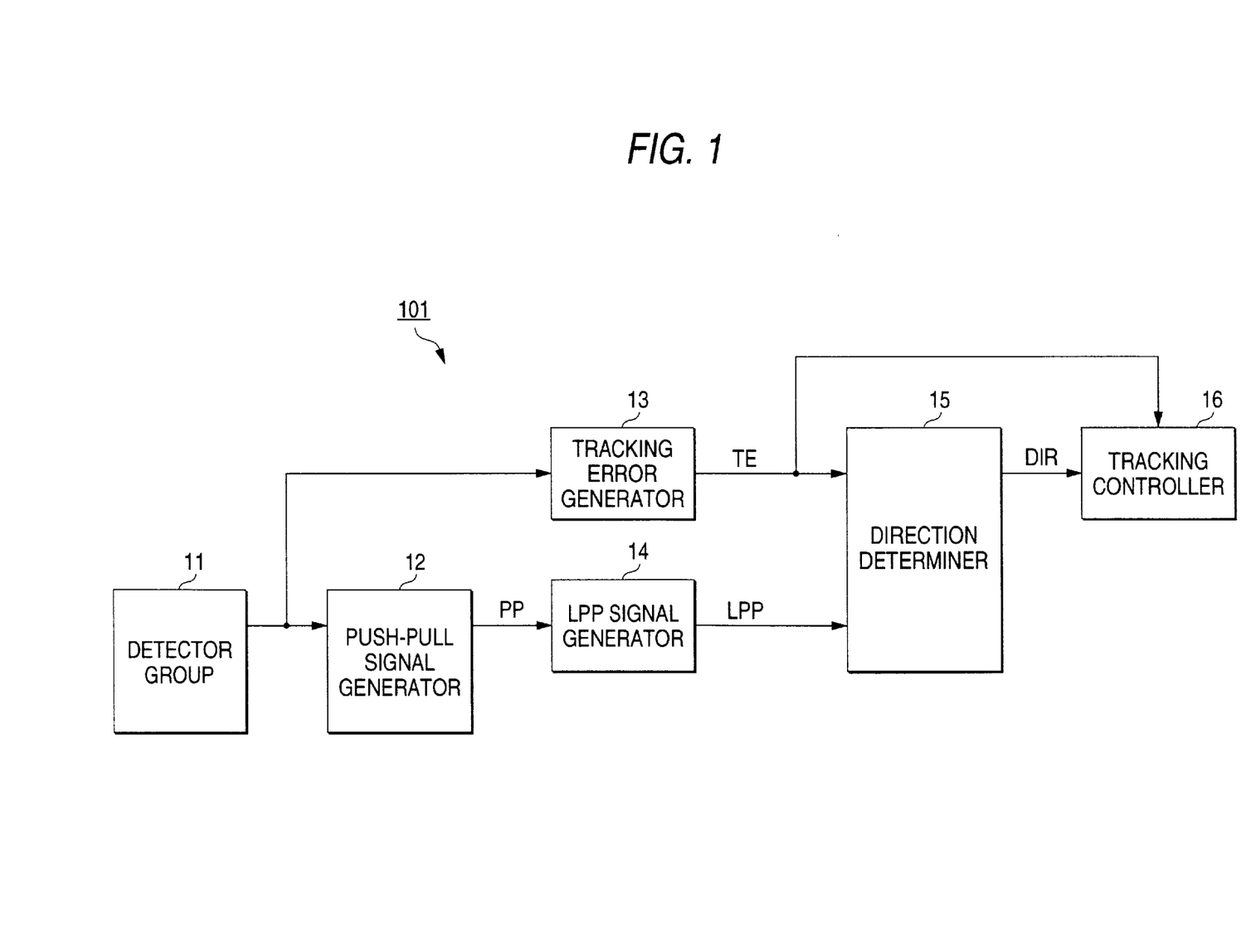
FIG. 1 is a diagram to show the configuration of an optical pickup of a first embodiment of the invention.

FIG. 1 is a diagram to show the configuration of an optical pickup of a first embodiment of the invention. As shown in FIG. 1, an optical pickup 101 comprises a detector group 11 for receiving return light provided by reflecting emission light from a light source such as a semiconductor laser (not shown) on an information record track of an optical disc, a push-pull signal generator 12, a tracking error generator 13, a land prepit signal generator 14, a direction determiner 15, and a tracking controller 16.

The detector group 11 is a photodetector having one or more light reception parts for receiving return light from an optical disc and outputting a light detection electric signal to the push-pull signal generator 12 and the tracking error generator 13. The detector group 11 corresponds to a photodetector. The push-pull signal generator 12 generates a push-pull signal PP based on the light detection electric signal from the light reception part of the detector group 1 and outputs the push-pull signal to the land prepit signal generator 14. The push-pull signal generator 12 corresponds to push-pull signal generation means.

The tracking error generator 13 generates a tracking error signal TE based on the light detection electric signal from the light reception part of the detector group 1 and outputs the tracking error signal TE to the direction determiner 15 and the tracking controller 16. The tracking error generator 13 corresponds to tracking error signal generation means.

The land prepit signal generator 14 extracts a land prepit component based on the push-pull signal PP and outputs a land prepit signal LPP to the direction determiner 15. The land prepit signal generator 14 corresponds to prepit signal generation means.

The direction determiner 15 outputs to the tracking controller 16 a direction detection signal DIR based on which the optical pickup move direction to move the optical pickup is determined based on the push-pull signal PP and the tracking error signal TE. The direction determiner 15 corresponds to optical pickup move direction detection means.

The tracking controller 16 has a tracking actuator (not shown) for moving the optical pickup based on the direction detection signal DIR and controls the disc radial direction position of emission light of the optical disc, whereby the emission light of the optical disc can be moved onto any desired information record track and bringing into tracking servo control can be performed. Then, the position of the optical pickup is controlled based on the tracking error signal TE so that the emission light of the optical pickup does not deviate from the on track position of the information record track. Thus, tracking servo control of the emission light of the optical pickup can be performed.

Figure 2:
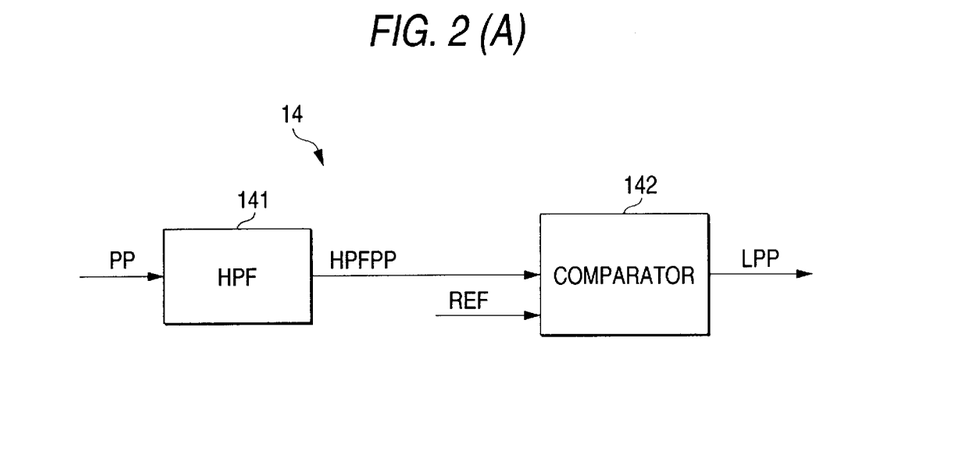
FIGS. 2(A) and 2(B) are a diagram and a chart to show the more detailed configuration and function of an example of an LPP signal generator in the optical pickup of the first embodiment of the invention.

Next, the more detailed configuration and function of an example of the land prepit signal generator 14 will be discussed with reference to FIGS. 2(A) and 2(B). FIG. 2(A) is a diagram to show the more detailed configuration of the example of the land prepit signal generator 14 and FIG. 2(B) is a timing chart to show the function of the example of the land prepit signal generator 14.

As shown in FIG. 2(A), the land prepit signal generator 14 has a high-pass filter (HPF) 141 and a comparator 142. The HPF 141 removes a low-frequency region component contained in the push-pull signal PP (the effect of eccentricity of optical disc) and extracts only a high-frequency region component. The HPF 141 corresponds to high frequency extraction means.

As shown at the top stage of the timing chart of FIG. 2(B), a beard-like high-frequency component is superposed on the push-pull signal PP because of the effect of a land prepit. The HPF 141 extracts the high-frequency component as a signal HPFPP as shown at the middle stage of FIG. 2(B) and outputs the signal HPFPP to the comparator 142. The comparator 142 corresponds to comparison means. The signal HPFPP corresponds to the high-frequency component containing the land prepit signal LPP.

The comparator 142 compares the signal HPFPP with one slice level REF (see the middle stage of the timing chart of FIG. 2(B)) and outputs the signal exceeding the slice level REF as the land prepit signal LPP (see the bottom stage of the timing chart of FIG. 2(B)). The slice level REF corresponds to a comparison value.

Figure 3:
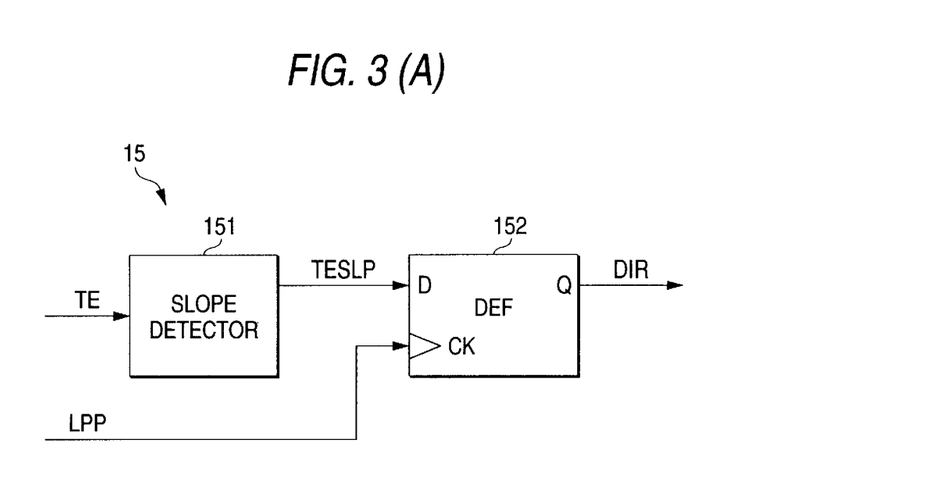
FIGS. 3(A) and 3(B) are a diagram and a chart to show the more detailed configuration and function of an example of a direction determiner in the optical pickup of the first embodiment of the invention.

Next, the more detailed configuration and function of an example of the direction determiner 15 will be discussed with reference to FIGS. 3(A) and 3(B). FIG. 3(A) is a diagram to show the more detailed configuration of the example of the direction determiner 15 and FIG. 3(B) is a timing chart to show the function of the example of the direction determiner 15.

As shown in FIG. 3(A), the direction determiner 15 has a slope detector 151 and a D-type flip-flop (DFF) 152. The slope detector 151 differentiates the tracking error signal TE to detect a differential coefficient (slope of waveform) and generates a tracking error slope signal TESLP. The slope detector 151 corresponds to tracking error slope signal generation means.

As shown at the top stage of the timing chart of FIG. 3(B), the tracking error signal TE becomes a wave-like signal and at one position, relative speed changes and the waveform of the tracking error signal TE becomes opposite. As shown at the middle stage of FIG. 3(B), the tracking error slope signal TESLP output from the slope detector 151 is set to 1 when the waveform of the tracking error signal TE increases; the tracking error slope signal TESLP is set to 0 when the waveform of the tracking error signal TE decreases.

The DFF 152 uses the tracking error slope signal TESLP as input data and the land prepit signal LPP as a latch pulse. Therefore, the tracking error slope signal TESLP is latched with the land prepit signal LPP as a clock, whereby the direction detection signal DIR is output (see the bottom stage of the timing chart of FIG. 3(B)). The DFF 152 corresponds to direction detection signal generation means.

Since the land prepit signal LPP is provided for the land portion of an optical disc, the direction detection signal DIR indicates the direction of relative speed between the spot provided by applying emission light from the optical pickup onto the optical disc (spot-like light) and information record track on the optical disc (in this case, the information record track is a groove). Therefore, using the direction detection signal DIR, the tracking controller 16 can detect the optical pickup move direction and it is made possible to bring into tracking servo control at any desired position.

(2) Second Embodiment

Figure 4:
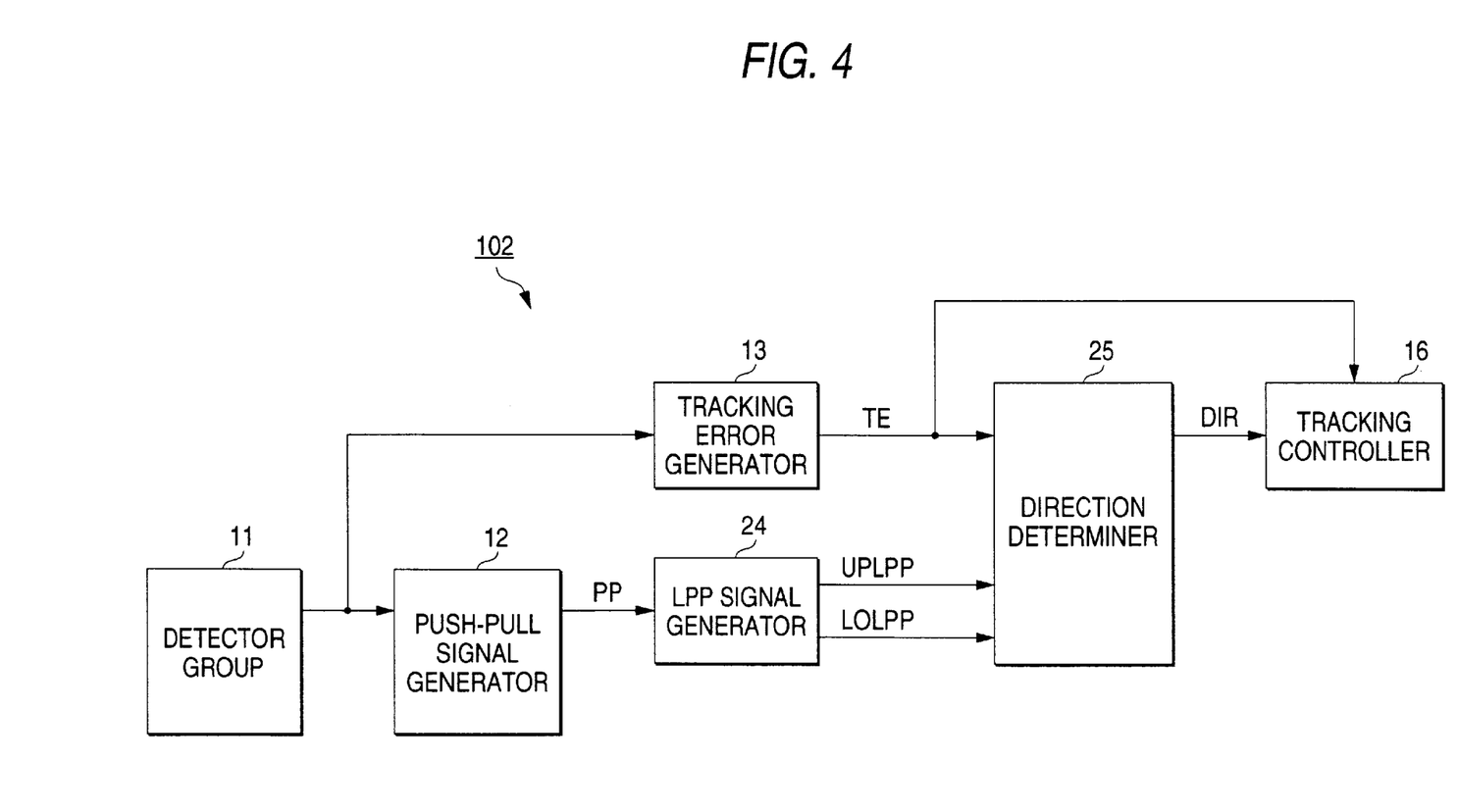
FIG. 4 is a diagram to show the configuration of an optical pickup of a second embodiment of the invention.

Next, a second embodiment of the invention will be discussed. FIG. 4 is a diagram to show the configuration of an optical pickup of the second embodiment of the invention. As shown in FIG. 4, an optical pickup 102 comprises a detector group 11 for receiving return light provided by reflecting emission light from a light source such as a semiconductor laser (not shown) on an information record track of an optical disc, a push-pull signal generator 12, a tracking error generator 13, a land prepit signal generator 24, a direction determiner 25, and a tracking controller 16.

The optical pickup 102 of the second embodiment differs from the optical pickup 101 of the first embodiment described above in that it has a different land prepit signal generator 24 and a different direction determiner 25. Other components are similar to those of the optical pickup 101 of the first embodiment and therefore will not be discussed again. Only the land prepit signal generator 24 and the direction determiner 25 will be discussed.

Figure 5:
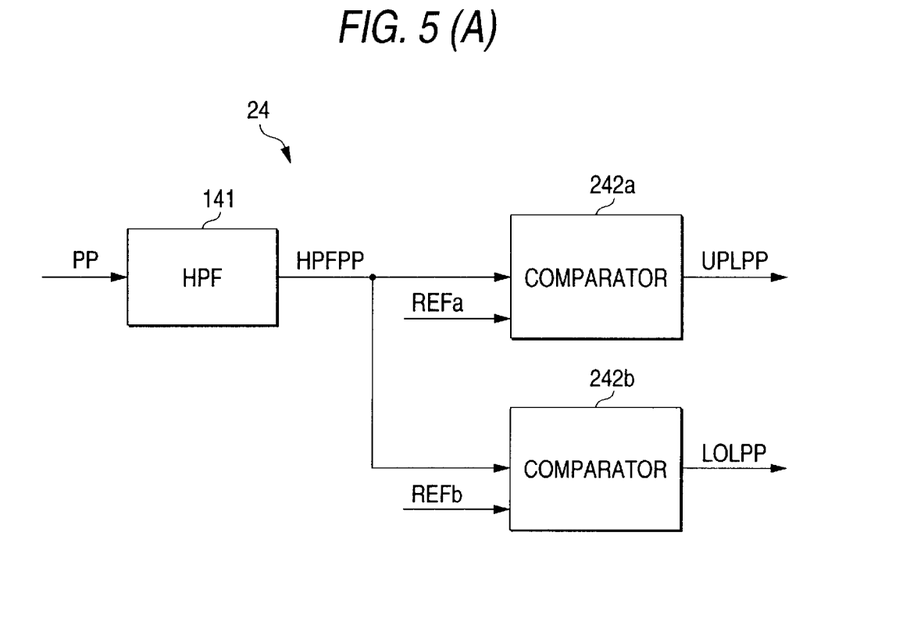
FIGS. 5(A) and 5(B) are a diagram and a chart to show the more detailed configuration and function of an example of an LPP signal generator in the optical pickup of the second embodiment of the invention.

FIGS. 5(A) and 5(B) are a diagram and a chart to show the more detailed configuration and function of an example of the land prepit signal generator 24. FIG. 5(A) is a diagram to show the more detailed configuration of the example of the land prepit signal generator 24 and FIG. 5(B) is a timing chart to show the function of the example of the land prepit signal generator 24.

As shown in FIG. 5(A), the land prepit signal generator 24 has an HPF 141 and comparators 242a and 242b. The HPF 141 removes a low-frequency region component contained in a push-pull signal PP (the effect of eccentricity of optical disc) and extracts only a high-frequency region component.

As shown at the top stage (first stage) of the timing chart of FIG. 5(B), a beard-like high-frequency component is superposed on the push-pull signal PP because of the effect of a land prepit. The HPF 141 extracts the high-frequency component as a signal HPFPP as shown at the second stage of FIG. 5(B) and outputs the signal HPFPP to the comparators 242a and 242b. The comparators 242a and 242b correspond to comparison means.

The comparator 242a compares the signal HPFPP with one slice level REFa (see the second stage of the timing chart of FIG. 5(B)) and outputs as an upper land prepit signal UPLPP (see the third stage of the timing chart of FIG. 5(B)). The comparator 242b compares the signal HPFPP with one slice level REFb (see the second stage of the timing chart of FIG. 5(B)) and outputs as a lower land prepit signal LOLPP (see the fourth stage (bottom stage) of the timing chart of FIG. 5(B)). The slice levels REFa and REFb correspond to comparison values.

Figure 6:
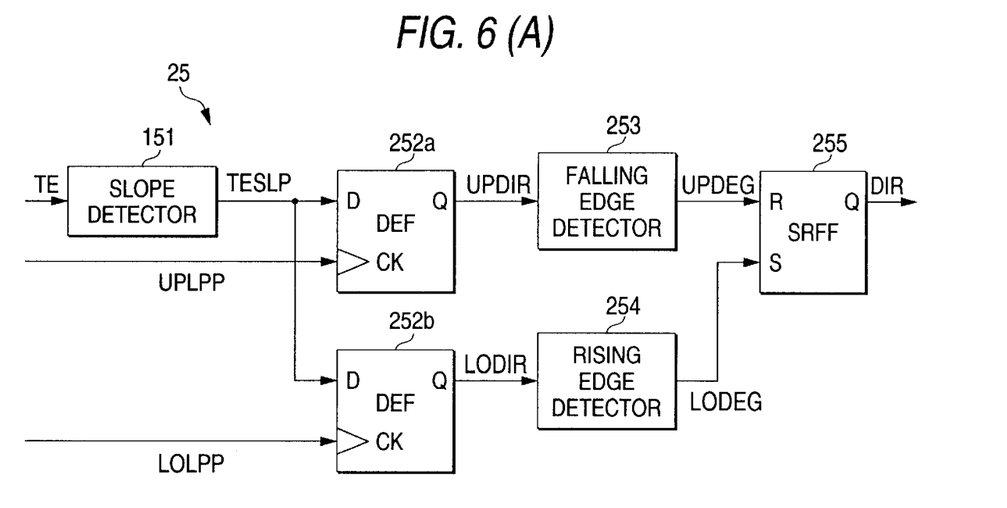
FIGS. 6(A) and 6(B) are a diagram and a chart to show the more detailed configuration and function of an example of a direction determiner in the optical pickup of the second embodiment of the invention.

Next, the more detailed configuration and function of an example of the direction determiner 25 will be discussed with reference to FIGS. 6(A) and 6(B). FIG. 6(A) is a diagram to show the more detailed configuration of the example of the direction determiner 25 and FIG. 6(B) is a timing chart to show the function of the example of the direction determiner 25.

As shown in FIG. 6(A), the direction determiner 25 has a slope detector 151, DFFs 252a and 252b, a falling edge detector 253, a rising edge detector 254, and a set reset flip-flop (SRFF) 255. The slope detector 151 differentiates a tracking error signal TE to detect a differential coefficient (slope of waveform) and generates a tracking error slope signal TESLP, then outputs the tracking error slope signal TESLP to the DFFs 252a and 252b. The slope detector 151 corresponds to tracking error slope signal generation means.

As shown at the top stage (first stage) of the timing chart of FIG. 6(B), the tracking error signal TE becomes a wave-like signal and at one position, relative speed changes and the waveform of the tracking error signal TE becomes opposite. As shown at the second stage of FIG. 6(B), the tracking error slope signal TESLP output from the slope detector 151 is set to 1 when the waveform of the tracking error signal TE increases; the tracking error slope signal TESLP is set to 0 when the waveform of the tracking error signal TE decreases.

The DFF 252a uses the tracking error slope signal TESLP as input data and the upper land prepit signal UPLPP as a latch pulse. Thus, a signal UPDIR is output (see the fifth stage of the timing chart of FIG. 6(B)). The DFF 252b uses the tracking error slope signal TESLP as input data and the lower land prepit signal LOLPP as a latch pulse. Thus, a signal LODIR is output (see the sixth stage of the timing chart of FIG. 6(B)).

The falling edge detector 253 detects the edge of the signal UPDIR and outputs an edge detection signal UPDEG (see the seventh stage of the timing chart of FIG. 6(B)). The rising edge detector 254 detects the edge of the signal LODIR and outputs an edge detection signal LODEG (see the eighth stage of the timing chart of FIG. 6(B)).

The SRFF 255 inputs the edge detection signal UPDEG as a reset pulse and the edge detection signal LODEG as a set pulse, whereby a direction detection signal DIR is output (see the ninth stage (bottom stage) of the timing chart of FIG. 6(B)). The DFFs 252a and 252b, the falling edge detector 253, the rising edge detector 254, and the SRFF 255 make up direction detection signal generation means.

Also in the configuration of the optical pickup of the second embodiment, the direction detection signal DIR indicates the direction of relative speed between the spot provided by applying emission light from the optical pickup onto the optical disc (spot-like light) and information record track on the optical disc. Therefore, using the direction detection signal DIR, the tracking controller 16 can detect the optical pickup move direction and it is made possible to bring into tracking servo control at any desired position.

Figure 10:
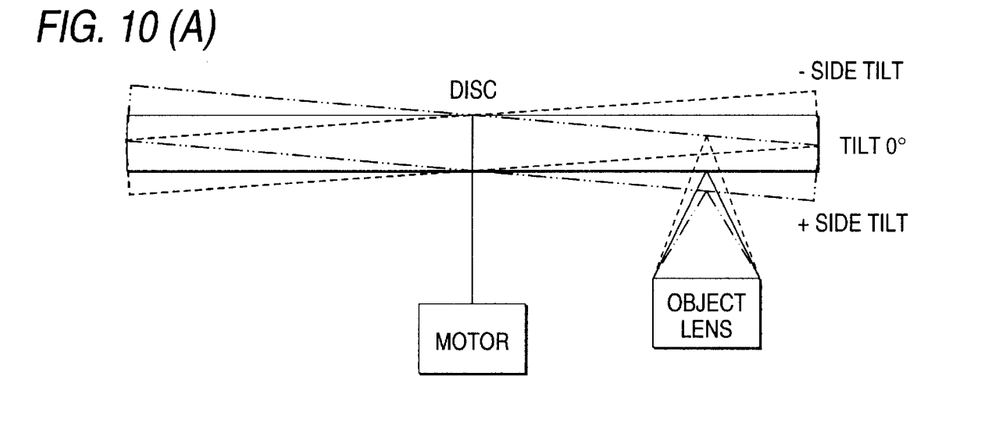
FIGS. 10(A) to 10(C) are drawings to describe the effect of tilt of an optical disc.

However, if an optical disc is tilted as shown in FIG. 10(A), the gain of the land prepit signal LPP in the push-pull signal PP changes as shown in FIGS. 10(B) and 10(C). Therefore, unless some countermeasures are taken, detection of the direction detection signal DIR is adversely affected. The effect of the disc tilt can be overcome in the embodiments described below:

(3) Third Embodiment

Figure 7:
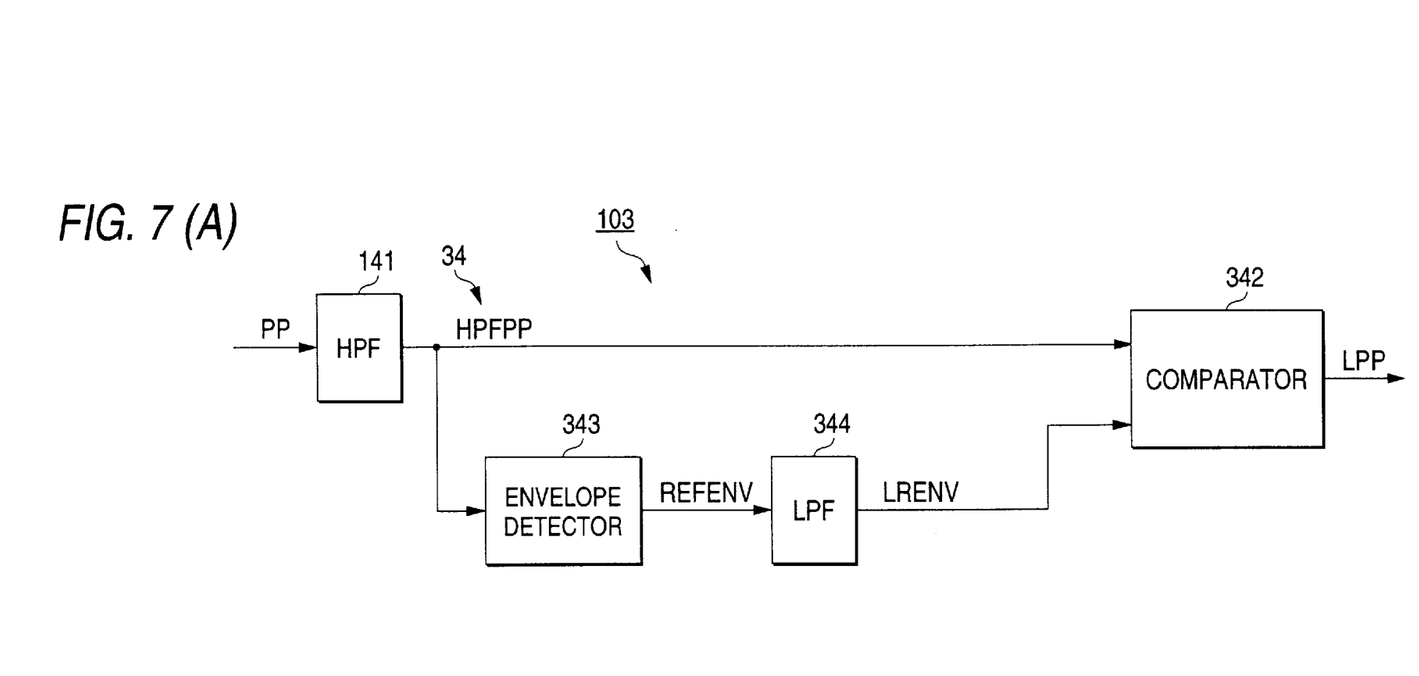
FIGS. 7(A) and 7(B) are a diagram and a chart to show the more detailed configuration and function of an example of an LPP signal generator in an optical pickup of a third embodiment of the invention.

Next, a third embodiment of the invention will be discussed. FIG. 7(A) is a diagram to show the configuration of a land prepit signal generator 34 in an optical pickup 103 of the third embodiment of the invention. The optical pickup 103 of the third embodiment differs from the optical pickup 101 of the first embodiment described above in that it has the different land prepit signal generator 34. Other components are similar to those of the optical pickup 101 of the first embodiment and therefore will not be discussed again. Only the land prepit signal generator 34 will be discussed.

FIGS. 7(A) and 7(B) are a diagram and a chart to show the more detailed configuration and function of an example of the land prepit signal generator 34. FIG. 7(A) is a diagram to show the more detailed configuration of the example of the land prepit signal generator 34 and FIG. 7(B) is a timing chart to show the function of the example of the land prepit signal generator 34.

As shown in FIG. 7(A), the land prepit signal generator 34 has an HPF 141, a comparator 342, an envelope detector 343, and a low-pass filter (LPF) 344. The HPF 141 removes a low-frequency region-component contained in a push-pull signal PP (the effect of eccentricity of optical disc) and extracts a high-frequency region component HPFPP (see the first stage of the timing chart of FIG. 7(B)).

The envelope detector 34.3 executes envelope detection of the signal HPFPP. A signal REFENV resulting from executing envelope detection of the signal HPFPP becomes a line connecting the amplitudes of land prepit component LPP contained in the signal HPFPP as shown at the second stage of the timing chart of FIG. 7(B) (see the dashed line at the second stage of the timing chart of FIG. 7(B)).

The LPF 344 extracts the low-frequency region component of the signal REFENV and outputs the low-frequency region component to the comparator 342 as a signal LRENV. The comparator 342 corresponds to comparison means.

The comparator 342 compares the signal HPFPP with the changing signal LRENV as a slice level (see the first stage of the timing chart of FIG. 7(B)) and outputs as a land prepit signal LPP (see the third stage of the timing chart of FIG. 7(B)). The slice level LRENV corresponds to a comparison value.

Therefore, if the land prepit component in the signal HPFPP changes as an optical disc is tilted, the slice level LRENV also changes accordingly, so that the land prepit signal LPP can be detected without a hitch.

Also in the configuration of the optical pickup of the third embodiment, a direction detection signal DIR indicates the direction of relative speed between the spot provided by applying emission light from the optical pickup onto the optical disc (spot-like light) and information record track on the optical disc. Therefore, using the direction detection signal DIR, a tracking controller can detect the optical pickup move direction and it is made possible to bring into tracking servo control at any desired position.

In the third embodiment, the envelope detector 343 and the LPF 344 make up disk tilt effect removal means.

(4) Fourth Embodiment

Figure 8:
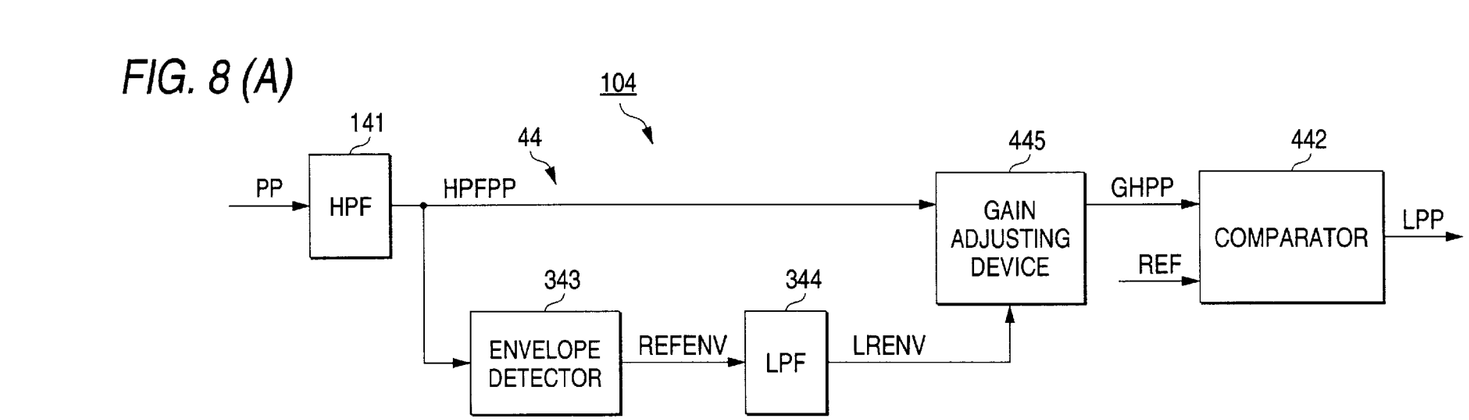
FIGS. 8(A) and 8(B) are a diagram and a chart to show the more detailed configuration and function of an example of an LPP signal generator in an optical pickup of a fourth embodiment of the invention.

Next, a fourth embodiment of the invention will be discussed. FIG. 8(A) is a diagram to show the configuration of a land prepit signal generator 44 in an optical pickup 104 of the fourth embodiment of the invention. The optical pickup 104 of the fourth embodiment differs from the optical pickup 101 of the first embodiment described above in that it has the different land prepit signal generator 44. Other components are similar to those of the optical pickup 101 of the first embodiment and therefore will not be discussed again. Only the land prepit signal generator 44 will be discussed.

FIGS. 8(A) and 8(B) are a diagram and a chart to show the more detailed configuration and function of an example of the land prepit signal generator 44. FIG. 8(A) is a diagram to show the more detailed configuration of the example of the land prepit signal generator 44 and FIG. 8B is a timing chart to show the function of the example of the land prepit signal generator 44.

As shown in FIG. 8(A), the land prepit signal generator 44 has an HPF 141, an envelope detector 343, an LPF 344, a gain adjusting device 445, and a comparator 442. The HPF141 removes a low-frequency region component contained in a push-pull signal PP (the effect of eccentricity of optical disc) and extracts a high-frequency region component HPFPP (see the first stage of the timing chart of FIG. 8(B)).

The envelope detector 343 executes envelope detection of the signal HPFPP. A signal REFENV resulting from executing envelope detection of the signal HPFPP becomes a line connecting the amplitudes of land prepit component LPP contained in the signal HPFPP.

The LPF 344 extracts the low-frequency region component of the signal REFENV and outputs the low-frequency region component to the gain adjusting device 445 as a signal LRENV (see the dashed line at the second stage of the timing chart of FIG. 8(B)).

The gain adjusting device 445 adjusts the gain of the signal HPFPP based on the signal LRENV, normalizes the amplitude of the signal, and outputs a signal GHPP (see the third stage of the timing chart of FIG. 8(B)) to the comparator 442. The comparator 442 corresponds to comparison means. The signal GHPP corresponds to a high-frequency component containing a land prepit signal LPP.

The comparator 442 compares the signal GHPP with a predetermined signal REF as a slice level (see the third stage of the timing chart of FIG. 8(B)) and outputs as a land prepit signal LPP (see the fourth stage of the timing chart of FIG. 8(B)). The slice level REF corresponds to a comparison value.

Therefore, if the land prepit component in the signal HPFPP changes as an optical disc is tilted, the gain of input GHPP in the comparator 442 is adjusted, so that the land prepit signal LPP can be detected without a hitch.

Also in the configuration of the optical pickup of the fourth embodiment, a direction detection signal DIR indicates the direction of relative speed between the spot provided by applying emission light from the optical pickup onto the optical disc (spot-like light) and information record track on the optical disc. Therefore, using the direction detection signal DIR, a tracking controller can detect the optical pickup move direction and it is made possible to bring into tracking servo control at any desired position.

In the fourth embodiment, the envelope detector 343, the LPF 344, and the gain adjusting device 445 make up disk tilt effect removal means.

(5) Fifth Embodiment

Figure 9:
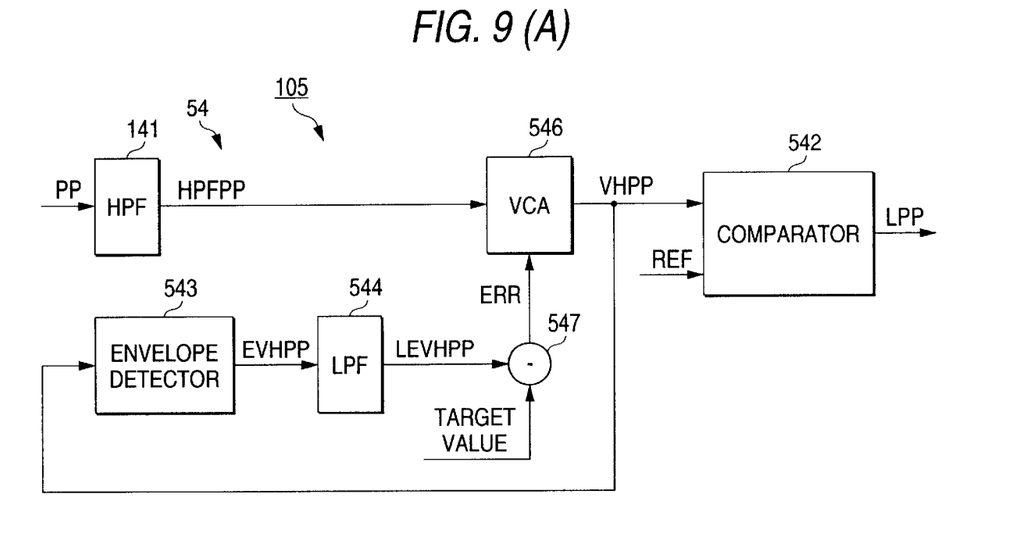
FIGS. 9(A) and 9(B) are a diagram and a chart to show the more detailed configuration and function of an example of an LPP signal generator in an optical pickup of a fifth embodiment of the invention.

Next, a fifth embodiment of the invention will be discussed. FIG. 9(A) is a diagram to show the configuration of a land prepit signal generator 54 in an optical pickup 105 of the fifth embodiment of the invention. The optical pickup 105 of the fifth embodiment differs from the optical pickup 101 of the first embodiment described above in that it has the different land prepit signal generator 54. Other components are similar to those of the optical pickup 101 of the first embodiment and therefore will not be discussed again. Only the land prepit signal generator 54 will be discussed.

FIGS. 9(A) and 9(B) are a diagram and a chart to show the more detailed configuration and function of an example of the land prepit signal generator 54. FIG. 9(A) is a diagram to show the more detailed configuration of the example of the land prepit signal generator 54 and FIG. 9(B) is a timing chart to show the function of the example of the land prepit signal generator 54.

As shown in FIG. 9(A), the land prepit signal generator 54 has an HPF 141, an envelope detector 543, an LPF 544, a subtractor 547, a voltage control amplifier (VCA), and a comparator 542. The HPF 141 removes a low-frequency region component contained in a push-pull signal PP (the effect of eccentricity of optical disc) and extracts a high-frequency region component HPFPP (see the first stage of the timing chart of FIG. 9(B)).

The VCA 546 multiplies input HPFPP by a gain in response to a signal ERR (described later) and outputs a signal VHPP. The signal VHPP corresponds to a high-frequency component containing a land prepit signal LPP.

The signal VHPP is input to the comparator 542, which then compares the signal VHPP with one slice level REF and detects the land prepit signal LPP. The comparator 542 corresponds to comparison means. The slice level REF corresponds to a comparison value.

The signal VHPP is input to the envelope detector 543, which then executes envelope detection of the signal VHPP and outputs a signal EVHPP. The signal EVHPP resulting from executing envelope detection of the signal VHPP becomes a line connecting the amplitudes of land prepit component LPP contained in the signal HPFPP (see the dashed line at the third stage of the timing chart of FIG. 9(B)).

The signal EVHPP is smoothed through the LPF 544, and is output as a signal LEVHPP (see the fourth stage of the timing chart of FIG. 9(B)).

The subtractor 547 calculates the difference between the signal LEVHPP and a predetermined target value and outputs the difference to the VCA 546 as a signal ERR (see the fifth stage of the timing chart of FIG. 9(B)). That is, the difference ERR from the target value is input to the VCA 546 and consequently the gain of the signal VHPP is controlled.

The envelope detector 543, the LPF 544, and the subtractor 547 make up a feedback loop of the VCA 546.

Therefore, if the land prepit component in the signal HPFPP changes as an optical disc is tilted, the gain of input VHPP in the comparator 542 is adjusted, so that the land prepit signal LPP can be detected without a hitch.

Also in the configuration of the optical pickup of the fifth embodiment, a direction detection signal DIR indicates the direction of relative speed between the spot provided by applying emission light from the optical pickup onto the optical disc (spot-like light) and information record track on the optical disc. Therefore, using the direction detection signal DIR, a tracking controller can detect the optical pickup move direction and it is made possible to bring into tracking servo control at any desired position.

In the fifth embodiment, the VCA 546, the envelope detector 543, the LPF 544, and the subtractor 547 make up disk tilt effect removal means.

The invention is not limited to the embodiments. The embodiments are illustrative and not restrictive, since the scope of the invention is defined by the appended claims, and all changes that fall within meets and bounds of the claims, or equivalents of such meets and bounds are therefore intended to be embraced by the claims.

As described throughout the specification, according to the invention, the return light from an optical disc is received and a light detection electric signal is output. A push-pull signal is generated from the light detection electric signal. A land prepit component is extracted from the push-pull signal and a land prepit signal is generated. A tracking error signal is generated from the light detection electric signal. The optical pickup move direction is detected based on the tracking error signal and the land prepit signal. Thus, if information is recorded on an optical disc at a high density and the information record track pitch becomes narrow and a limitation is imposed on the groove depth, bringing into track servo control can always be performed at the correct position, so that stable tracking control can be performed.

What is claimed is:

1. In an optical pickup for writing optical disc record information onto an information record track of an optical disc having prepits based on emission light from a light source or reading the optical disc record information from return light provided by reflecting emission light from the light source on the information record track, an optical pickup direction detection unit for detecting a direction to move the optical pickup in order to position the emission light on the information record track, said optical pickup direction detection unit comprising:

a photodetector for receiving the return light and outputting a light detection electric signal;

push-pull signal generation means for generating a push-pull signal from the light detection electric signal from said photodetector;

prepit signal generation means for extracting a prepit component from the push-pull signal and generating a prepit signal, wherein the prepit component is exclusively a result of a prepit located in a land portion of the optical disc;

tracking error signal generation means for generating a tracking error signal from the light detection electric signal from said photodetector, wherein the tracking error signal is based on a continuous guide groove in the optical disc; and optical pickup move direction detection means for detecting the move direction of the optical pickup based on the tracking error signal and the prepit signal.

2. The optical pickup direction detection unit as claimed in claim 1, wherein said optical pickup move direction detection means comprises:

tracking error slope signal generation means for differentiating the tracking error signal and generating a tracking error slope signal; and direction detection signal generation means for latching the tracking error slope signal with the prepit signal as a clock and generating a direction detection signal.

3. The optical pickup direction detection unit as claimed in claim 1, wherein said prepit signal generation means extracts upper and lower components of the prepit from the push-pull signal and generates upper and lower prepit signals, and wherein said optical pickup.move direction detection means comprises:

tracking error slope signal generation means for differentiating the tracking error signal and generating a tracking error slope signal; and direction detection signal generation means for generating a direction detection signal with an edge detection signal with the tracking error slope signal latched using the upper prepit signal as a clock as a reset pulse and an edge detection signal with the tracking error slope signal latched using the lower prepit signal as a clock as a set pulse.

4. The optical pickup direction detection unit as claimed in claim 1, wherein said prepit signal generation means comprises:

high frequency extraction means for extracting a high-frequency component containing the prepit signal from the push-pull signal; and comparison means for comparing the high-frequency component with a comparison value.

5. The optical pickup direction detection unit as claimed in claim 4, further comprising disc tilt effect removal means for removing the effect of tilt of the optical-disc by adjusting the comparison value.

6. The optical pickup direction detection-unit as claimed in claim 4, further comprising disc tilt effect removal means for removing the effect of tilt of the optical disc by adjusting the high-frequency component.

7. In an optical pickup for writing optical disc record information onto an information record track of an optical disc having prepits based on emission light from a light source or reading the optical disc record information from return light provided by reflecting emission light from the light source on the information record track, an optical pickup direction detection method for determining a direction to move the optical pickup in order to position the emission light on the information record track, said optical pickup direction detection method comprising the steps of:

receiving the return light and outputting a light detection electric signal;

generating a push-pull signal from the light detection electric signal;

extracting a prepit component from the push-pull signal and generating a prepit signal, wherein the prepit component is exclusively a result of a prepit located in a land portion of the optical disc;

generating a tracking error signal from the light detection electric signal, wherein the tracking error signal is based on a continuous guide groove in the optical disc; and detecting the move direction of the optical pickup based on the tracking error signal and the prepit signal.

8. An optical pickup device operable to write on and read from an optical disc, the optical pickup device comprising:

a photodetector operable to receive return light reflected on the optical disc and output a light detection electric signal;

a push-pull signal generator operable to generate a push-pull signal based on the light detection electric signal;

a prepit signal generator operable to extract a prepit component of the push-pull signal and generate a prepit signal, wherein the prepit component is exclusively a result of a prepit located in a land portion of the optical disc;

a tracking error signal generator operable to generate a tracking error signal based on the light detection electric signal; and an optical pickup move direction detector operable to detect a move direction of the optical pickup device based on the tracking error signal and the prepit signal.

9. An optical pickup device as claimed in claim 8, wherein the tracking error signal is based on a continuous guide groove in the optical disc.

10. A method of determining a move direction of an optical pickup device in order to position emission light on an information record track, the method comprising:

receiving return light reflected from an optical disc;

outputting a light detection electric signal based on the reflected light;

generating a push-pull signal from the light detection electric signal;

extracting a prepit component from the push-pull signal, wherein the prepit component is exclusively a result of a prepit located in a land portion of the optical disc;

generating a prepit signal based on the extracted prepit component;

generating a tracking error signal from the light detection electric signal; and determining the move direction of the optical pickup device based on the tracking error signal and the prepit signal.

11. A method as claimed in claim 10, wherein the tracking error signal is based on a continuous guide groove in the optical disc.

12. In an optical pickup for writing optical disc record information onto an information record track of an optical disc having prepits based on emission light from a light source or reading the optical disc record information from return light provided by reflecting emission light from the light source on the information record track, an optical pickup direction detection unit for detecting a direction to move the optical pickup in order to position the emission light on the information record track, said optical pickup direction detection unit comprising:

a photodetector for receiving the return light and outputting a light detection electric signal;

push-pull signal generation means for generating a push-pull signal from the light detection electric signal from said photodetector;

prepit signal generation means for extracting a prepit component from the push-pull signal and generating a prepit signal;

tracking error signal generation means for generating a tracking error signal from the light detection electric signal from said photodetector;

optical pickup move direction detection means for detecting the move direction of the optical pickup based on the tracking error signal and the prepit signal; and disc tilt effect removal means for removing the effect of tilt of the optical disc by adjusting the comparison value, wherein said prepit signal generation means comprises;
high frequency extraction means for extracting a high-frequency component containing the prepit signal from the push-pull signal; and
comparison means for comparing the high-frequency component with a comparison value.

13. In an optical pickup for writing optical disc record information onto an information record track of an optical disc having prepits based on emission light from a light source or reading the optical disc record information from return light provided by reflecting emission light from the light source on the information record track, an optical pickup direction detection unit for detecting a direction to move the optical pickup in order to position the emission light on the information record track, said optical pickup direction detection unit comprising:

a photodetector for receiving the return light and outputting a light detection electric signal;

push-pull signal generation means for generating a push-pull signal from the light detection electric signal from said photodetector;

prepit signal generation means for extracting a prepit component from the push-pull signal and generating a prepit signal;

tracking error signal generation means for generating a tracking error signal from the light detection electric signal from said photodetector;

optical pickup move direction detection means for detecting the move direction of the optical pickup based on the tracking error signal and the prepit signal; and disc tilt effect removal means for removing the effect of tilt of the optical disc by adjusting the high-frequency component, wherein said prepit signal generation means comprises;
high frequency extraction means for extracting a high-frequency component containing the prepit signal from the push-pull signal; and
comparison means for comparing the high-frequency component with a comparison value.

* * * * *